UNITED STATES PATENT OFFICE.

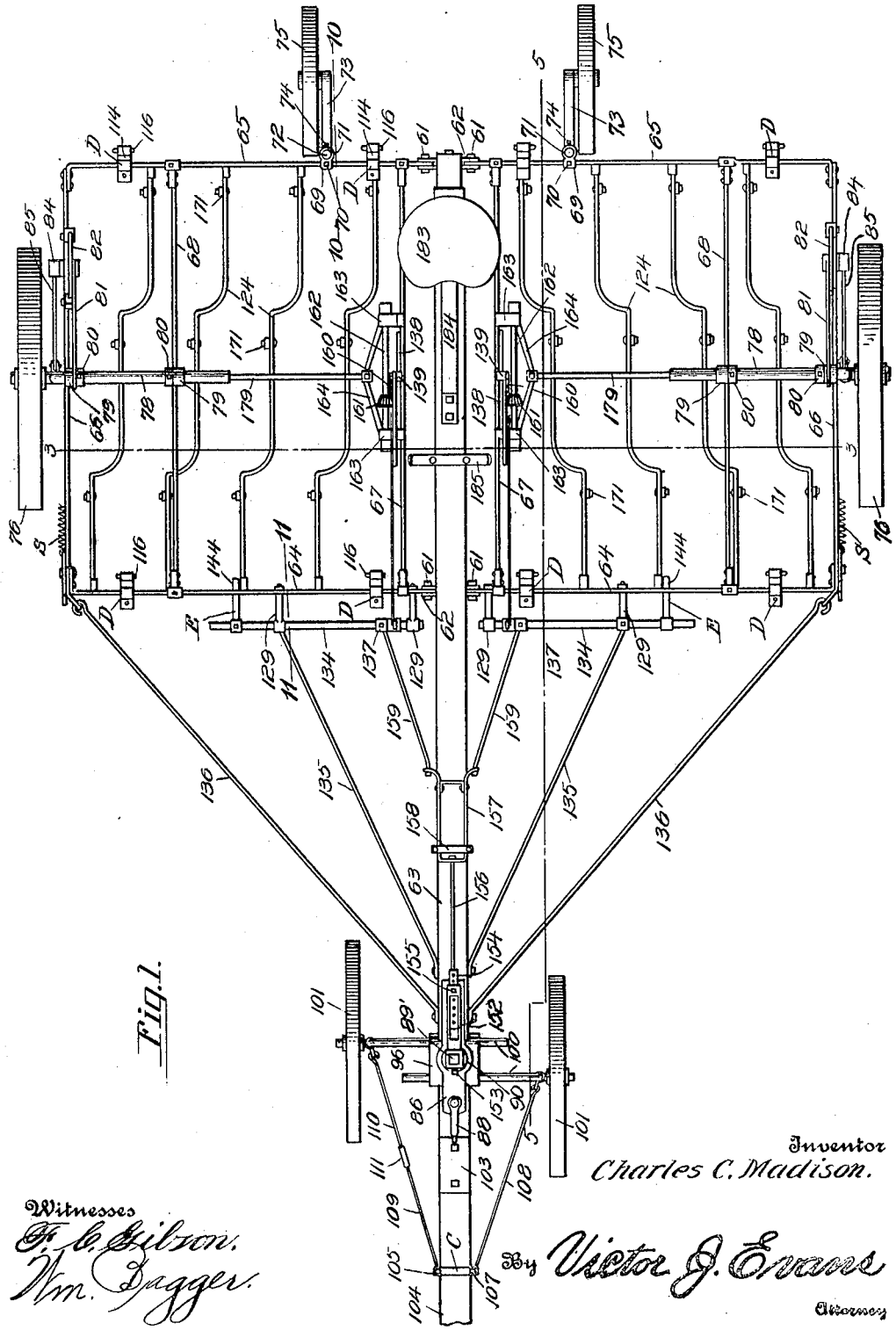

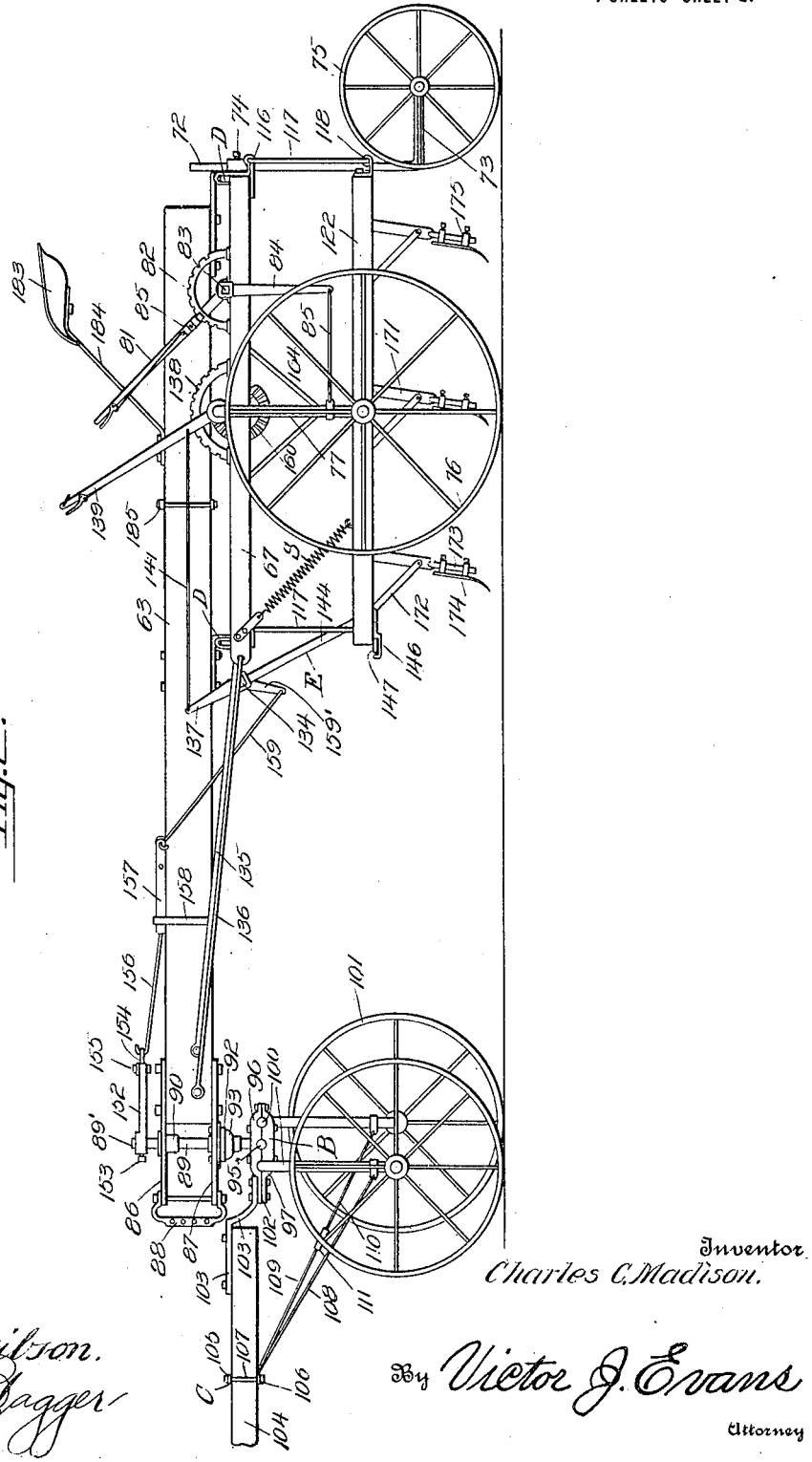

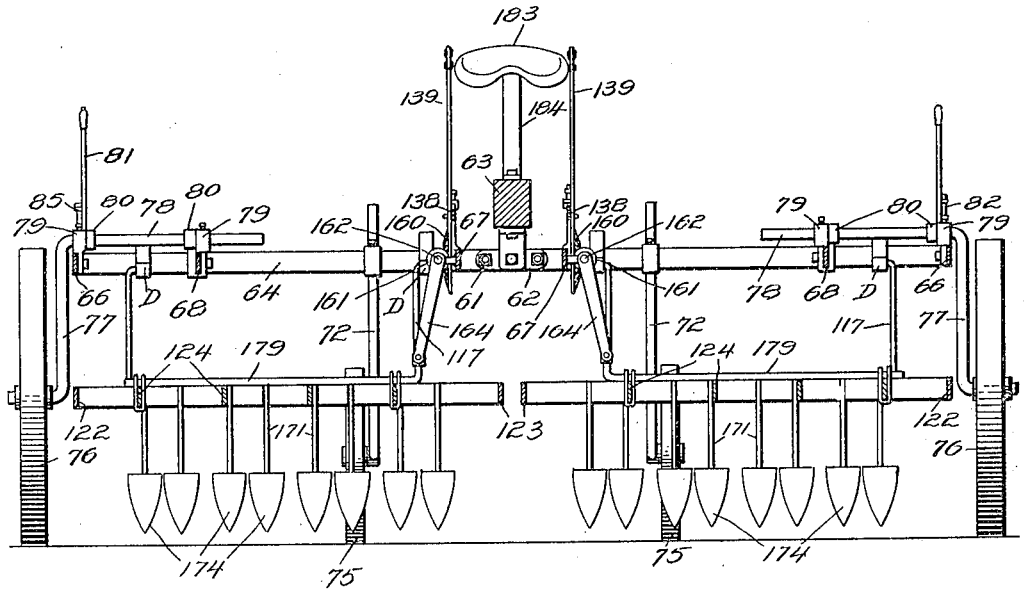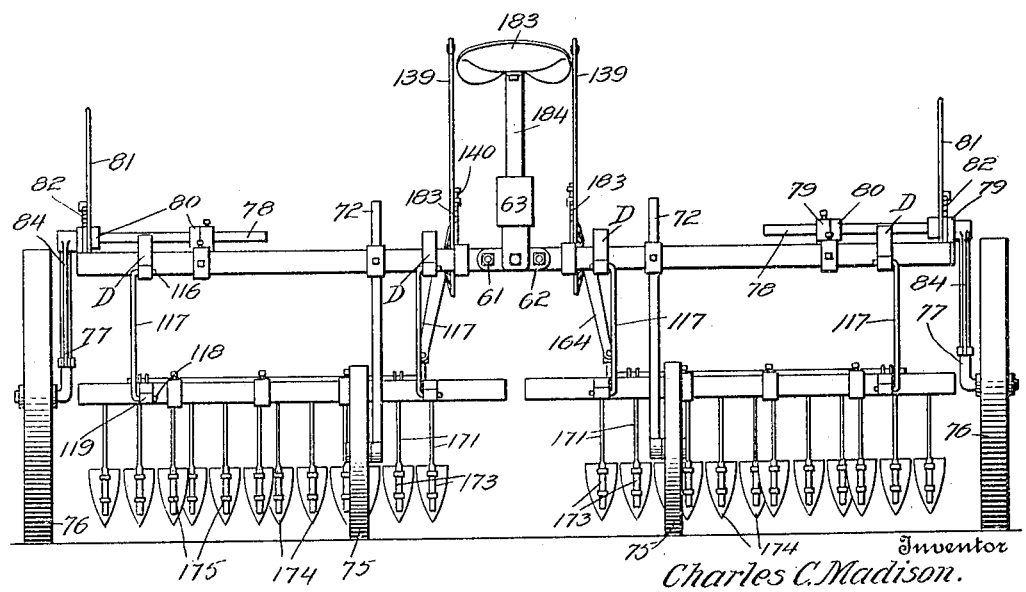

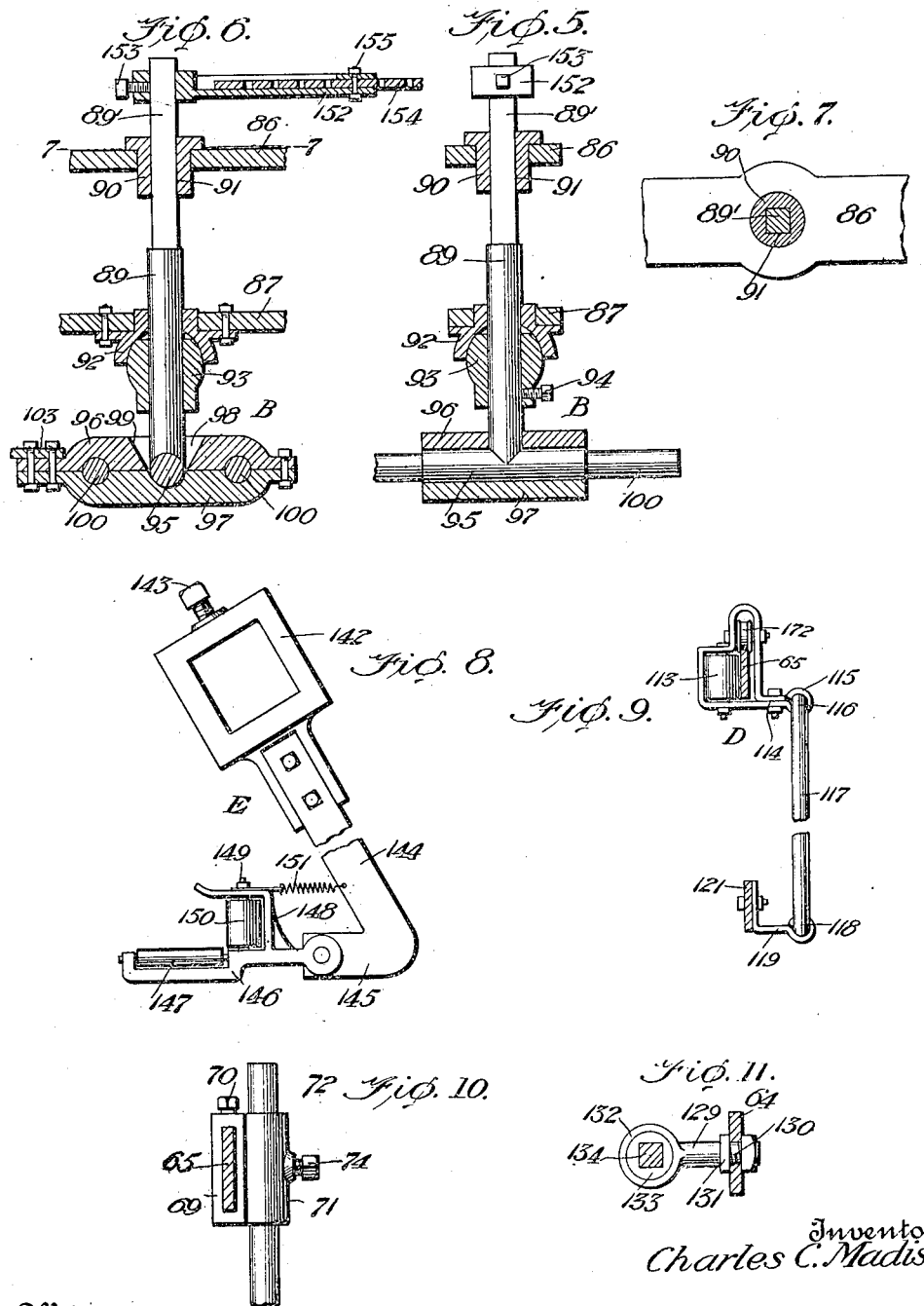

CHARLES C. MADISON, OF SCANDIA, KANSAS.

CULTIVATING IMPLEMENT.

1,261,579. Specification of Letters Patent. Patented Apr. 2, 1918.

Application filed April 26, 1915. Serial No. 24,131.

*To all whom it may concern:*

Be it known that I, CHARLES C. MADISON, a citizen of the United States, residing at Scandia, in the county of Republic and State of Kansas, have invented new and useful Improvements in Cultivating Implements, of which the following is a specification.

This invention relates to agricultural implements classified as cultivators.

One object of the invention is to produce a machine of the class described comprising a wheel supported carrying frame, a gang frame supported by the carrying frame by means of suspending links and novel and efficient means whereby the gang frame may be raised and lowered.

A further object of the invention is to produce a machine of the class described combining a wheel supported main frame or carrying frame, a pair of gang frames supported thereby for independent slidable movement laterally, and means whereby the gang frames may be raised or lowered with respect to the main frame.

A further object of the invention is to simplify and improve the construction and arrangement of the detailed parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of the machine adapted to be used as a surface cultivator.

Fig. 2 is a side elevation of the same.

Fig. 3 is a transverse sectional view taken on the line 3—3 in Fig. 1.

Fig. 4 is a rear elevation.

Fig. 5 is a transverse sectional view of the front truck.

Fig. 6 is a sectional detail view taken on the line 6—6 in Fig. 5.

Fig. 7 is a sectional detail view taken on the line 7—7 in Fig. 6.

Fig. 8 is a detail view in side elevation of one of the lifting arms E.

Fig. 9 is a detail side view of one of the carriers D.

Fig. 10 is a sectional detail view taken on the line 10—10 of Fig. 1.

Fig. 11 is a sectional detail view taken on the line 11—11 of Fig. 1.

Corresponding parts in the several figures are denoted by like characters of reference.

The top frame or main frame of the improved implement is composed of two separate sections which are hingedly connected by bolts or pivot members 61 with plates 62 carried by the reach bar 63 to which said plates are suitably attached. Each section of the top frame includes front and rear bars 64, 65 connected together at their outer ends by end bars 66, near their inner ends by bars 67 and intermediate their ends by bars 68. Slidably mounted on the rear end bars 65 are cuffs 69 retained in position by set screws 70 and equipped with vertically disposed sleeves 71 through which stems 72 having arms or cranks 73 are guided and retained in position by set screws 74. The arms 73 carry the rear wheels 75 which by first loosening the set screws 74 may be raised or lowered. The main supporting wheels 76 are mounted on cranks 77 at the ends of shafts 78 which are supported for rotation in boxes 79 that are supported on the frame bars 66, 68. Any well known means, such as set collars 80, may be employed for preventing the shafts 78 from sliding longitudinally in their bearings when the machine is in operation without interfering with the free rocking of said shafts which is controlled by means to be hereafter described; it is to be understood, however, that the shafts 78 may be reversed end for end, thus permitting the wheels 76 to be positioned adjacent to the outer faces of the end bars 66 or adjacent to the inner faces of the intermediate bars 68, as may be preferred. For controlling the rocking movement of the shafts 78 whereby the frame may be raised or lowered with respect to the supporting wheels, hand levers 81 are provided; said hand levers being fulcrumed on lever stands including rack segments 82 which may be detachably bolted on the frame and which are capable of being mounted on the frame bars 66 or 68, at will, and according to the positioning of the wheels 70 with respect to the frame. The hand lever 81 is connected with a shaft 83 having a crank arm 84 which is connected by a rod 85 with the axle crank 77 which may thus be rocked, thereby raising or lowering the main frame. The hand lever 81 is provided with a stop member 85 engaging the rack segment 82 for the purpose of securing the parts at various adjustments.

The reach bar 63 extends materially in advance of the main frame and at the forward end of said reach bar to the upper end under faces thereof are bolted plates 86, 87 which are connected together at their forward ends by a clevis holder 88 with which an evener may be connected by means of an ordinary clevis for the attachment of the draft. The plates 86, 87 are provided with suitably reinforced bearings for an inverted T bar 89, the upper end of which is squared, as shown. It will further be seen that the bearing aperture in the plate 86 contains a sleeve 90 having a squared aperture 91 for the passage of the squared portion 89', of the T bar which is thus fitted for rotation. The bearing plate 87 is equipped with a thrust bearing comprising a socket 92 adapted to receive a ball member 93 held on the T-bar by means of a set screw 94. The cross piece 95 at the lower end of the T-bar is supported for rocking movement in a bearing member composed of two half boxes 96, 97, see Fig. 6, the upper one of which has an opening 98 for the passage of the T-bar, said opening having beveled walls 99 to permit of rocking movement of the bearing member with respect to said T-bar. The bearing member is also provided with bearings for a pair of crank axles 100 carrying the front supporting wheels or truck wheels 101. The bearing member composed of the parts 96, 97 and which as a whole has been designated by the letter B is provided with a forwardly extending lug 102 with which is connected a bracket 103 to which the tongue 104 is attached. Slidably mounted on the tongue is a clip member C comprising top and bottom plates 105, 106 and connecting bolts 107 by tightening which the clip member may be firmly secured at various adjustments. Said clip member is connected with the crank axles 100 by means of connecting members, one of which consists simply of a rod 108. The other connecting member is composed of two rods 109, 110 which are adjustably connected together by a coupling 111.

It will be seen from the foregoing that the T-bar 89 virtually constitutes a king bolt that permits the truck to turn about its axis when the machine is to be turned in the field. When it is desired to raise or to lower the main frame this may be effected by manipulating the hand levers 81 to rock the crank axles carrying the main supporting wheels 76; the rear supporting wheels 75 are then adjusted by effecting vertical adjustment of the shanks 72 in their respective sleeves 71, said shanks being subsequently secured by the set screws 74. The bolts 106 of the clamp C are next loosened so as to permit the clamp to slide along the tongue, thereby rocking the crank axles 100 to the requisite extent. Inasmuch, however, as the two wheels 101 by such adjustment would be positioned unevenly, an additional adjustment of the connecting member composed of the parts 109, 110 becomes necessary to place the wheels in proper alinement, after which the bolts 107 are retightened.

Slidably mounted on the front and rear bars 64, 65 of the sections or members of the main frame are carriers D, shown in detail in Fig. 9, said carriers having wheels 112 that ride on the upper edges of the frame bars and rollers 113 that bear against the front faces of said frame bars. Each carrier is also provided with a rearwardly extending bracket 114 having a terminal eye or bearing 115 that receives a crank 116 at the upper end of a connecting link 117, the lower end of which is provided with a crank 118 engaging a bearing 119, said bearings 119 being fixed respectively on the front and rear bars 120, 121 of the gang frames which are thus supported by the main frame in such fashion as to be capable of a longitudinal swinging movement, it being understood that the cranks 116, 118 are positioned transversely with respect to the frames. It is obvious that by swinging forwardly or rearwardly from their lowermost positions the gang frames will be lifted from the ground and upwardly. Before describing the mechanism whereby such lifting movement is accomplished it may be stated that each of the gang frames, in addition to the front and rear bars 120, 121, includes outer and inner end bars designated, respectively, by 122, 123; also that the beams 124 are detachably connected with the front and rear bars 120, 121 by means of cuffs 125 slidable on said bars where they may be secured at various adjustments by set screws 126, each of said cuffs being provided with a bracket 127 on which one end of one of the beams 124 is secured. Lifting springs S are provided to connect the gang frames with the main frame sections for the purpose of partly sustaining the weight of the gang frames and thus imposing no unnecessary weight on the mechanism provided for effecting vertical adjustment of the gang frames.

The front bar 64 of each section of the top or main frame is provided with forwardly extending brackets 129, shown in detail in Fig. 11, each of said brackets having at its rear end a threaded portion 130 and a shoulder or offset 131, said threaded portion being inserted through an aperture in the front bar 64 upon which the shoulder 131 abuts, the bracket being secured by means of a nut engaging the threaded portion thereof and tightened up against the rear face of the bar 64. Each bracket 129 has at its front end an eye or bearing 132 wherein is fitted a sleeve 133 having a non-circular preferably square bore or aperture to receive a shaft 134 of square cross section. It will be seen that each bar 64 is provided with two brackets 129 supporting a square shaft 134. Brace rods 135 connect the outermost brackets 129 with the reach bar 63. Additional braces 136 having their forward ends connected with the reach bar are extended divergently in a rearward direction, the rear ends of said brace bars being connected with the outermost end bars 66 of the sections of the main frame.

Each of the shafts 134, which while of square cross section constitutes a rock shaft, is provided with a radial arm 137, normally extending in an upward direction. Mounted on each of the inner end bars 61 of the top frame sections is a lever stand including a rack segment 138 whereon is fulcrumed a hand lever 139 having a stop member 140 adapted to engage the rack segment. Each hand lever is connected by a rod 141 with the upwardly extending arm 137 of one of the rock shafts 134. Each of the rock shafts 134 also carries one or more lifting arms E shown in detail in Fig. 8. Each of said lifting arms comprises a sleeve or cuff 142 adjustable on the shaft 134 where it may be secured in adjusted position by means of a set screw 143. Said sleeve has a downwardly and rearwardly extending arm 144 terminating at its lower end in a forward extension 145 with which is pivotally connected a bracket 146 carrying a longitudinally and approximately horizontally disposed roller 147 that extends beneath the front frame bar 120 of one of the gang frames, said roller being of a length considerably exceeding the width of the frame bar in order that it may at all times and under all conditions be maintained in engagement therewith. The bracket 146 is provided with an angular arm 148 to support one end of a pin 149, the other end of which is supported in the body portion of the bracket 146, said pin constituting a spindle on which a vertically disposed roller 150 is journaled, said roller bearing against the rear face of one of the frame bars 120 beneath which the roller 147 extends. A coiled spring 151 serves to connect the L-shaped arm 148 with the arm 144, said spring exerting a lifting action on the pivoted bracket 146 and the parts carried thereby. The rollers 147 and 150 will thus be maintained in engagement with the lower edge and the rear face of the frame bar 120 engaged by the lifting arm.

By manipulating the hand lever 139 on either section of the main frame either one of the rock shafts 134 may be oscillated, with the effect of causing the rollers 147, 150 of the lifting arms associated therewith to bear upwardly and forwardly against the frame bar 120 engaged by said lifting arms, and thus lifting or raising the gang frame to an extent governed by the extent of the movement of the hand lever, the stop member of which serves to retain the parts in adjusted position. The bracket 146 being pivotally connected with the body of the lifting arm is enabled to maintain the requisite horizontal position in various positions of the lifting arm, said bracket, or more properly, the rollers 147, 150 associated therewith being maintained in contact with the bar 120 of one of the gang frames by the action of the spring 151. It is obvious that the springs 151 associated with the several lifting arms must in the aggregate be sufficiently powerful to sustain the weight imposed thereon by the gang frames.

For the purpose of automatically lifting the gang frames from the ground when the machine is to be turned at the end of the field and for again restoring the gang frames to ground engaging position when the turn has been completed, mechanism is provided including an arm or crank 152 which is fixed by a set screw 153 near the upper end of the T-bar or king bolt member 89. Said crank has an extension member 154 adjustably connected therewith by a bolt 155, and said extension member is connected by a rod 156 with a slide 157 connected with the reach bar 63 by a ring or collar 158. The slide 157 is connected by rods 159 with lifting arms 159' connected with the rock shafts 134 associated with two sections of the main frame, said lifting arms extending downwardly with respect to the shafts 134. It will be readily seen that when in turning the machine the truck is turned with respect to the main frame the T-bar or king bolt will be turned about its axis, thus causing the crank 152 to exert stress on the slide 157 which is in turn communicated to the lifting arms whereby the gang frames will be raised from the ground. When, after turning the machine, the normal position of the truck is reassumed, the gang frames will be automatically lowered to ground engaging position.

Each of the hand levers 139 is provided with a bevel gear segment 160 meshing with a bevel pinion 161 on a rock shaft 162 which is supported in bearings 163 on the frame bar 67 with which the hand lever is associated. The rock shaft 162 is provided with crank arms 164, suitably secured thereon, said crank arms being angularly constructed so that their outer ends will converge.

A seat 183 for the driver or operator is adjustably mounted on a supporting spring 184 which is bolted or otherwise secured on the reach bar where a foot rest 185 is also provided.

Having thus described the invention, what is claimed as new, is:—

1. In a machine of the class described, a reach bar, main frame sections connected therewith, gang frames, links suspending the gang frames from the main frame sections for longitudinal swinging movement, rock shafts on the main frame sections, lifting arms connected with the rock shafts and engaging the front bars of the gang frames, crank arms extending from the rock shafts, a truck supporting the forward end of the reach bar and including a king bolt member revoluble about its axis with said truck when the latter is turned, a crank arm extending from the king bolt member, and connecting means between said crank arm and the crank arms on the rock shafts.

2. In a machine of the class described, a reach bar, main frame sections connected therewith, gang frames, links suspending the gang frames from the main frame sections for longitudinal swinging movement, rock shafts on the main frame sections, lifting arms connected with the rock shafts and engaging the front bars of the gang frames, crank arms extending from the rock shafts, a truck supporting the forward end of the reach bar and including a king bolt member revoluble about its axis with said truck when the latter is turned, a crank arm extending from the king bolt member, and connecting means between said crank arm and the crank arms on the rock shafts; said connecting means including a slide supported on the reach bar, a rod connecting said slide with the crank arm of the king bolt member, and rods connecting said slide with the crank arms on the rock shafts.

3. In a machine of the class described, a main frame section, carriers slidably engaging the front and rear bars of said section, a gang frame, link bars connecting the gang frame with the carriers for longitudinal swinging movement, a rock shaft supported on the main frame section, a lifting arm connected with the rock shaft and including a spring supported bracket having rollers engaging the rear face and the bottom edge of the front bar of the gang frame, and means for actuating the rock shaft.

4. In a machine of the class described, a main frame section, carriers slidably engaging the front and rear bars of said section, a gang frame, link bars connecting the gang frame with the carriers for longitudinal swinging movement, a rock shaft supported on the main frame section, a lifting arm connected with the rock shaft and including a spring supported bracket having rollers engaging the rear face and the bottom edge of the front bar of the gang frame, means for actuating the rock shaft, and means for imparting to the gang frame a sliding movement transversely of the main frame section.

In testimony whereof I affix my signature in presence of two witnesses.

CHARLEY C. MADISON.

Witnesses:
DAVID E. DICKERHOOF,
THOMAS J. SHAVER.

Copies of this patent may be obtained for five cents each, by addressing the "Commissioner of Patents, Washington, D. C."